(12) United States Patent
Hiraku et al.

(10) Patent No.: US 6,792,929 B2
(45) Date of Patent: Sep. 21, 2004

(54) METHOD FOR DETECTING FAILURE OF INJECTION FUEL HEATERS OF INTERNAL COMBUSTION ENGINE

(75) Inventors: Keizo Hiraku, Susono (JP); Hiroshi Kanai, Susono (JP); Toru Kidokoro, Hadano (JP); Hideki Suzuki, Susono (JP); Kazuki Sato, Kariya (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 233 days.

(21) Appl. No.: 10/050,798

(22) Filed: Jan. 18, 2002

(65) Prior Publication Data

US 2002/0124839 A1 Sep. 12, 2002

(30) Foreign Application Priority Data

Mar. 7, 2001 (JP) ........................................ 2001-063586
Nov. 13, 2001 (JP) ........................................ 2001-347176

(51) Int. Cl.[7] ................................................ F02D 41/00
(52) U.S. Cl. ..................... 123/690; 123/549; 73/119 A; 73/118.1
(58) Field of Search ................................ 123/690, 543, 123/549, 557; 73/119 A, 118.1

(56) References Cited

U.S. PATENT DOCUMENTS

| | | | | |
|---|---|---|---|---|
| 4,346,686 A | * | 8/1982 | Wakita et al. | 123/339.11 |
| 4,433,665 A | * | 2/1984 | Abe et al. | 123/552 |
| 5,634,454 A | | 6/1997 | Fujita | |
| 5,701,877 A | * | 12/1997 | Aoki | 123/697 |
| 5,894,832 A | | 4/1999 | Nogi et al. | |
| 6,136,169 A | * | 10/2000 | Okamoto | 204/401 |
| 6,176,226 B1 | | 1/2001 | Nines et al. | |
| 6,474,292 B1 | | 11/2002 | Frenz et al. | |

FOREIGN PATENT DOCUMENTS

| | | |
|---|---|---|
| JP | A 9-291873 | 11/1997 |
| JP | 9-291873 | 11/1997 |
| JP | 10-238424 | 9/1998 |
| JP | A 10-238424 | 9/1998 |
| WO | WO 00/29740 | 5/2000 |
| WO | WO 00/52315 | 9/2000 |

* cited by examiner

Primary Examiner—John Kwon
(74) Attorney, Agent, or Firm—Oliff & Berridge, PLC

(57) ABSTRACT

To detect a failure of the fuel heaters of a multi-cylinder internal combustion engine of vehicles by utilizing a microcomputer of a vehicle operation control device and sensors already provided in the vehicle such as an air/fuel ratio sensor or a crankshaft rotation sensor, with a supplement of substantially only a software, a failure of the heater corresponding to one of the cylinders is detected based upon a change exhibited in at least one parameter with regard to the operating conditions of the engine such as exhaust air/fuel ratio, crankshaft rotation angular speed, etc. by the injected fuel not having been heated as expected by a predetermined operation of each heater.

11 Claims, 13 Drawing Sheets

METHOD FOR DETECTING FAILURE OF INJECTION FUEL HEATERS OF INTERNAL COMBUSTION ENGINE

BACKGROUND OF THE INVENTION

1. Field of the Invention

The present invention relates to internal combustion engines for vehicles or the like, and more particularly, to a method for detecting a failure of injection fuel heaters provided in a fuel injection system of an internal combustion engine.

2. Description of the Prior Art

In order to preserve the atmospheric environment, modern internal combustion engines for vehicles or the like are equipped with injection fuel heaters in the fuel injection system thereof, whereby in the cold start of the engine the fuel heaters are operated, so that the fuel injected into the intake port or the combustion chamber is better atomized for a better combustion, so that thereby the emission of CO and HC by the exhaust gas of the engine is decreased as much as possible.

The fuel heaters are provided each at a housing portion of a fuel injection valve or at a fuel supply passage for supplying fuel to the fuel injection valve at a position adjacent its entrance, the fuel injection valves being provided each for each cylinder of the engine. The fuel heaters are each adapted to heat the fuel to be injected by a heat generated therein according to an electric resistance or an electromagnetic induction.

Those heaters are operated under such severe conditions of the engine that they are constantly subjected to violent vibrations and high temperatures, and are therefore not free from failure. It is desirable that, when one has failed, the failure is detected without delay. Further, since the heaters are separately provided for respective cylinders, it is desirable that it is known which of them has failed.

The internal combustion engines of automobiles or the like are multi-cylinder internal combustion engines having four or more cylinders. Therefore, when the fuel heaters are provided separately at respective fuel injection valves or in the vicinity thereof for the plurality of cylinders, the same number of fuel heaters are provided as the number of cylinders. Even when those plurality of fuel heaters are manufactured according to the same design and the same production process and are mounted to one engine at the same time, it is generally not foreseen which of those plurality of heaters will fail under a synergistic influence of an unavoidable fluctuation of the finished condition of the products and a small difference of each working environment. When one of them has failed, it is important that, in addition to the fact of the failure, the failed heater is specified.

The fuel heaters herein concerned are electrically operated devices, in which the failure is generally a severance in its current conducting portion. Therefore, such a failure would be readily detected with an identification of the individual heater when a galvanometer or a similar current detecting means is provided in the current supply passage for each heater. However, it increases correspondingly substantially the cost of the internal combustion engine to provide such a current detecting means for each of a plurality of fuel heaters corresponding to the number of cylinders.

SUMMARY OF THE INVENTION

Therefore, it is an object of the present invention to detect a failure of the fuel heaters with no addition of the conventional current detection means which causes an engine cost increase, by, instead, utilizing the microcomputer of a vehicle operation control device generally mounted in the modern automobiles, with such input information available from those sensors generally already provided in those vehicles, such as an air/fuel ratio sensor or a crankshaft rotation speed sensor.

According to the present invention, the above-mentioned object is accomplished by a method for detecting a failure of heaters provided in a fuel supply system of an internal combustion engine for heating a fuel injected, characterized by detecting the failure based upon a change which occurs at least in a parameter concerned with operating conditions of the engine due to the injected fuel not having been heated to a predetermined degree of heating.

In the above-mentioned method for detecting a failure of the heaters, the change in the parameter may be an increase of air/fuel ratio of an exhaust gas of the engine as compared with a value thereof to be expected when the injected fuel has been heated to the predetermined degree of heating.

Or, in the above-mentioned method for detecting a failure of the heaters, the change in the parameter may be a change in a performance of at least one of rotational speed, rotational acceleration and changes thereof of the engine corresponding to one of cylinders thereof.

Further, in the above-mentioned method for detecting a failure of the heaters, the change in the parameter may be a substantial non difference between values of the parameter according to operations of the engine with the heater being put on and the heater not being put on, respectively.

Further, in the above-mentioned method for detecting a failure of the heaters, the change in the parameter may be a substantial difference in values thereof between cylinders of the engine.

Further, the heaters for respective cylinders of the engine may be operated with a time shift therebetween in order to detect the difference in the parameter between an operation of the engine with the heaters being put on in a predetermined manner and an operation of the engine with the heaters not being put on.

The time shift in the operations of the heaters for the respective cylinders may be such that the heaters for the respective cylinders are put on with a time shift therebetween, or the heaters for the respective cylinders are put off with a time shift therebetween.

Or alternatively, two cylinders which are most distant from one another in the phases of operation of the engine may be made a pair of cylinders, and the heaters for such pairs of cylinders may be operated with a time shift therebetween in order to detect a difference in the parameter between an operation of the engine with the heaters being operated in a predetermined manner and an operation of the engine with the heaters not being operated.

In this case, also, the time shifted operations for the respective cylinders may be such that the heaters are put on with a time shift between respective such pairs of cylinders, or the heaters are put off with a time shift between respective such pairs of cylinders.

It is in the operation of several tens of seconds from the starting of the internal combustion engine in a cold state that the operation of the fuel heaters are required and they exhibit their effects. Just after the cold start of the engine, since the temperature of the wall of the combustion chamber of the engine is low, the fuel ejected from the fuel injection valve is apt to stick to the wall surfaces of the intake port and the combustion chamber as a liquid.

When such a sticking of the fuel to the wall surfaces of the intake port and the combustion chamber occurs, the fuel-air mixture becomes correspondingly lean, so that the engine is liable to fail in starting or the rotation of the engine becomes irregular. Such a fuel sticking to those wall surfaces can be temporarily met by temporarily increasing the amount of fuel injection. However, the fuel stuck on the wall surfaces is irregularly shifted toward the exhaust port with a part thereof combusted in the meantime while other remaining in liquid, thereby in any event causing a rough rotation of the engine and a deterioration of the exhaust gas purification.

In view of the above, the fuel heater is operated so as to heat the fuel ejected from the fuel injection valve, so that the injected fuel is better atomized, suppressing the fuel sticking to the wall surfaces of the inlet port and the combustion chamber in a liquid form, so that the engine rotates smoothly with a supply of fuel and air in a stoichiometric ratio from the beginning of the engine starting, thereby also making the exhaust gas to be stoichiometric.

Nevertheless, if the fuel heater for any one of the cylinders fails, so that the fuel injected in the cylinder is not heated, a sticking of liquid fuel to the wall surfaces of the intake port and the combustion chamber will occur in the cylinder, whereby the fuel-air mixture in the particular cylinder becomes lean with a corresponding increase of the effective air/fuel ratio, with the exhaust gas from the particular cylinder being rendered to show an exhaust air/fuel ratio corresponding to the ratio of the air based components to the fuel based components in the exhaust gases being increased from the value thereof expected from the supply of air and fuel, also inducing a misfire, thereby causing a loss of the corresponding torque generation.

Therefore, if it is detected with respect to at least one parameter concerning the operating conditions of the engine such as the exhaust air/fuel ratio or the rotation angular speed of the engine that the parameter has changed from a value thereof which should be exhibited when the fuel has been heated to a predetermined degree of heating in a tendency indicating that the fuel has not been heated to the predetermined degree of heating, it can be detected that the corresponding fuel heater has failed.

Such a parameter may be the exhaust air/fuel ratio of the exhaust gas corresponding to each cylinder of the engine, and the change in the parameter may be judged by an increase of the exhaust air/fuel ratio as compared with that exhibited when the fuel has been heated to the predetermined degree of heating.

On the other hand, when the fuel heater for a certain cylinder has failed, the torque generated by the cylinder decreases correspondingly, whereby there occurs a corresponding change in the performance of rotational speed or rotational acceleration of the engine corresponding to each cylinder. Therefore, the afore-mentioned change in the parameter may be a change in the rotational speed or the rotational acceleration of the engine corresponding to each cylinder.

Further, it is possible to detect a failure occurred at a certain one of the fuel heaters by the engine being operated with the fuel heaters being put on according to a predetermined manner, while the engine is operated with the fuel heaters not being put on, thereby judging if there is no difference in the parameter.

It is considered that in the engine of the automobiles or the like having four or more cylinders each equipped with each fuel heater, the probability of a second heater going to a failure following to a failure of a first heater within a one cycle surveillance of the microcomputer such as tens to hundreds microseconds is zero. (This is not the probability of a second heater going to a failure when a failure of a first heater has been left unrepaired in spite of the failure.) Therefore, it will also be possible to detect that one of the fuel heaters has failed based upon a detection of a difference occurring in the parameter between the respective cylinders.

This concept allows a probability of detecting a failure of the fuel heaters of a multi-cylinder internal combustion engine during a normal operation of the engine with the fuel heaters being put on, without taking a period of operating the engine with the heaters being put off for the purpose of detecting a failure of the fuel sensors, when the measuring techniques of air/fuel ratio, rotational speed or rotational acceleration of the engine are further improved, thereby allowing an inspection of the fuel heaters to be made optionally during a normal operation of the engine.

Further, in case of a multi-cylinder internal combustion engine, the difference between a parameter of the engine in its operation with the fuel heaters being put on and the parameter of the engine in its operation with the fuel heaters not being put on can be more clearly detected by the fuel heaters for the respective cylinders being operated with a time shift between respective cylinders.

A method of shifting the operation of the fuel heaters for the respective cylinders in time relative to one another is to shift the time of putting on the fuel heaters for the respective cylinders, while another method is to shift the time of putting off the fuel heaters for the respective cylinders. By overlapping the results of such inspections, a failure or not of the fuel heaters will be detected at a higher precision.

Further, in case of a multi-cylinder internal combustion engine, the difference between the parameter of the engine when it is operated with the fuel heaters being put on and the parameter when the engine is operated with the fuel heaters not being put on can be more clearly detected by each two cylinders thereof most distant from one another in the phases of operation are made each pair, whereby the fuel heaters for each such pair of the cylinders are operated with a time shift against other such pairs of cylinders.

Also in this case, the time shift of the operation of each pair of fuel heaters may be effected by shifting the time of putting on of each pair of fuel heaters, or by shifting the time of putting off each pair of fuel heaters. By such a shifting of the time of effective operation of the heaters from one another, a failure or not of the fuel heaters will be detected at a higher precision.

BRIEF DESCRIPTION OF THE DRAWINGS

In the accompanying drawings.

DESCRIPTION OF THE PREFERRED EMBODIMENTS

Figure 1:
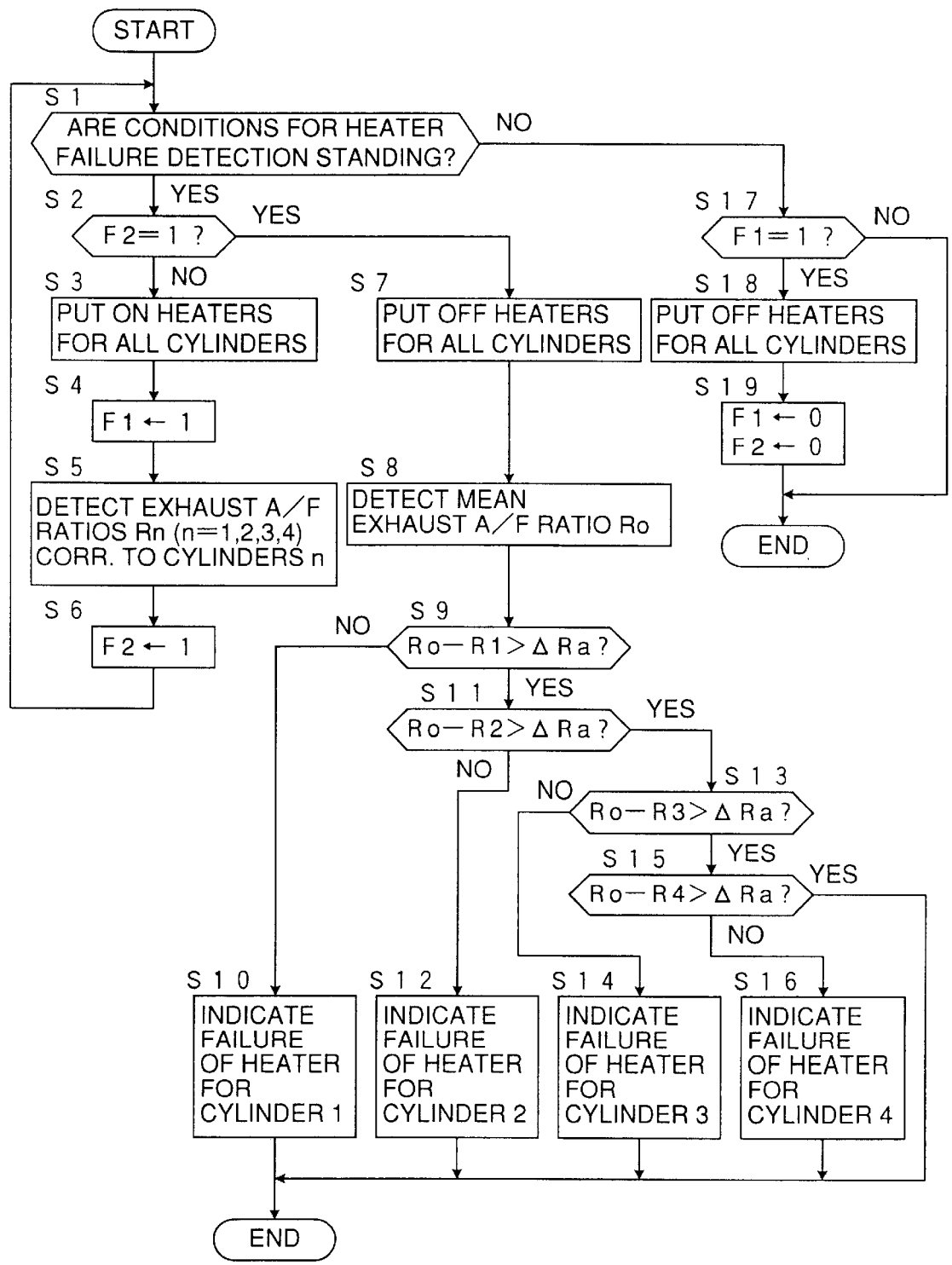
FIG. 1 is a flowchart showing an embodiment of a method for detecting a failure of injection fuel heaters of an internal combustion engine according to the present invention.

As described above, the present invention is constructed as a software by using a vehicle operation control device equipped with a microcomputer as already well known in the art to function in various manners and well known sensors such as an air/fuel ratio sensor detecting the air/fuel ratio of the combustion from its exhaust gas and a crankshaft rotation sensor which are usually provided in those vehicles equipped with the vehicle operation control device.

Further, the fuel supply system equipped with the fuel injection valves for the internal combustion engines and the injection fuel heaters therefor are also well known in various types in the art. Since the present invention is intended to be applied to those well known fuel supply systems and the fuel heaters, any detailed descriptions with respect to such basic hardware or an illustration thereof will be omitted to avoid a redundancy of the specification and the drawing.

In this regard, such a construction for controlling the fuel injection valve and the injection fuel heater by a vehicle operation control device equipped with a microcomputer operating with input signals including a signal from an air/fuel ratio sensor (oxygen sensor) provided in its exhaust system is shown in, for example, Japanese Patent Laid-open Publication 11-148441. Further, an example of the detailed construction of a fuel injection valve having a housing incorporating a fuel heater therein is shown in Japanese Patent Laid-open Publication 10-238424.

The present invention may be carried out by an injection fuel heating system for an internal combustion engine such as shown in the figures of those publications.

Referring to FIG. 1 showing a flowchart of an embodiment of the method for detecting a failure of injection fuel heaters according to the present invention, when the control according to the flowchart is started by an ignition switch of the vehicle not shown in the figure being closed, in step 1 it is judged if the vehicle operating condition is in a state to allow an execution of a heater failure detecting operation as described hereinbelow. Conditions for such a state may be determined to include that the engine of the vehicle is being started in a cold state, the vehicle is still at a standstill, and the accelerator pedal is not depressed by the driver.

Further, the condition that the parking brake is still actuated may be added. In this regard, these conditions may differ according to the speed and the precision of the detecting operation of the air/fuel ratio sensor or the crankshaft rotational speed sensor, so that when the speed or precision of detecting operation of these sensors is improved, the conditions for the state of executing the failure detection are loosened such that, for example, the failure detection may be carried out after the warming up of the engine, or ultimately, no operating conditions of the engine for the execution of the failure detection are regarded.

When the answer of step 1 is yes, the control proceeds to step 2, wherein it is judged if a flag F2 is 1 or not. The flag F2 is set to 1 in the below-mentioned step 6. Therefore, as a flag like this is generally reset to 0 at the beginning of the control, when the control comes to this step at first time, the answer is no, and the control proceeds to step 3.

In step 3, fuel heaters for all cylinders are put on. Although these heaters may be controlled according to a feedback of an output signal of the exhaust air/fuel ratio sensor in the normal operation, it is desirable that the operation of the heaters for the failure detection made by step 3 is such an operation as to provide a constant degree of heating to the fuel without a feedback. After all heaters have been started, a control proceeds to step 4, wherein a flag F1 is set to 1.

Then the control proceeds to step 5, wherein air/fuel ratios Rn (assuming that the engine is a four cylinder engine, n=1, 2, 3, 4) of exhaust gases corresponding to cylinders n of the engine are successively detected. It is possible to detect the respective air/fuel ratios corresponding to the respective cylinders even by a single air/fuel ratio sensor provided at a gathering portion of an exhaust manifold by setting time points of detection in synchronization with the rotational angle of the crankshaft. Then the control proceeds to step 6, wherein the flag F2 is set to 1, and then the control returns before step 1.

Then again in step 1, it is judged if the conditions for executing the heater failure detecting operation are still standing. When the answer is yes, the control proceeds to step 2. In step 2, the answer is now yes, and therefore the control proceeds to step 7. In this regard, steps 2 and 6 may be omitted, so that when step 5 was finished, the control proceeds to step 7 without again confirming if the conditions for executing the heater failure detecting operation are standing.

In step 7, the heaters for all cylinders are once put off. Then the control proceeds to step 8, wherein, a mean value Ro of the exhaust air/fuel ratios of all cylinders is detected. Since no heaters for any cylinders are now put on, there should be no difference of the exhaust air/fuel ratio with respect to any cylinder regardless of failure or not failure of the heaters, so that the exhaust air/fuel ratio of each cylinder in the engine operation with no heater being put on is a single mean value.

Then the control proceeds to step 9, wherein it is judged if the difference between the exhaust air/fuel ratio Ro at non heater operation and the air/fuel ratio R1 for cylinder 1 with the heater being put on is larger than a predetermined threshold value ΔRa. The exhaust air/fuel ratio Ro at non heater operation should increase temporarily by a part of the injected fuel sticking to the wall surface of the intake port and/or the combustion chamber.

Therefore, if the heater for cylinder 1 has not failed, there should exist a difference between Ro and R1 beyond a threshold value such as ΔRa. On the other hand, if there is no such difference, it is guessed that the heater for cylinder 1 has failed. Therefore, when the answer of step 9 is no, the control proceeds to step 10, wherein it is indicated that the heater for cylinder 1 has failed. When even one heater has failed, it should be replaced as soon as possible. Therefore, the control is terminated here by holding an appropriate failure indication.

When there is no failure in the heater for cylinder 1, so that the answer of step 9 is yes, the control proceeds to step 11, wherein it is judged if the difference between Ro and R2 for cylinder 2 is larger than the threshold value ΔRa. Similarly, when the answer is no, it is guessed that the heater for cylinder 2 has failed. Then the control proceeds to step 12, wherein it is indicated that the heater for cylinder 2 has failed, and then the control is terminated.

When there is no failure in the heater for cylinder 2, so that the answer of step 11 is yes, the control proceeds to step 13, wherein it is judged if the difference between Ro and R3 for cylinder 3 is larger than the threshold value ΔRa. Similarly, when the answer is no, it is guessed that the heater for cylinder 3 has failed. Therefore the control proceeds to step 14, wherein it is indicated that the heater for cylinder 3 has failed, and then the control is terminated.

When there is no failure in the heater for cylinder 3, so that the answer of step 13 is yes, the control proceeds to step 15, wherein it is judged if the difference between Ro and R4 for cylinder 4 is larger than the threshold value ΔRa. Similarly, when the answer is no, it is guessed that the heater for cylinder 4 has failed. Then the control proceeds to step 16, wherein it is indicated that the heater for cylinder 4 has failed, and the control is terminated. When there is no failure in the heater for cylinder 4, so that the answer of step 15 is yes, the control is terminated with no further action.

When the conditions for executing the heater failure detecting operation are not standing, so that the answer of step 1 is no from the beginning or when the answer of step 1 has turned to no when the control returned to step 1 after having passed through steps 2–6 by a change of the vehicle operating condition in the meantime, so that the conditions for executing the failure detecting operation are no longer standing, the control proceeds from step 2 to step 17, wherein it is judged if the flag F1 is 1 or not.

When the control has reached step 17 after having passed through steps 2–6, the flag F1 is 1, so that the answer is yes. In this case, the control proceeds to step 18, wherein the operation of the heaters started in step 3 for the execution of the heater failure detection is stopped, and then in step 19 the flags F1 and F2 are reset to zero, before terminating the control.

When the control reached to step 17 without passing through steps 2–6, the flag F1 is remaining at zero as reset in the beginning. In this case, the control is terminated without passing through steps 18 and 19.

Figure 2:
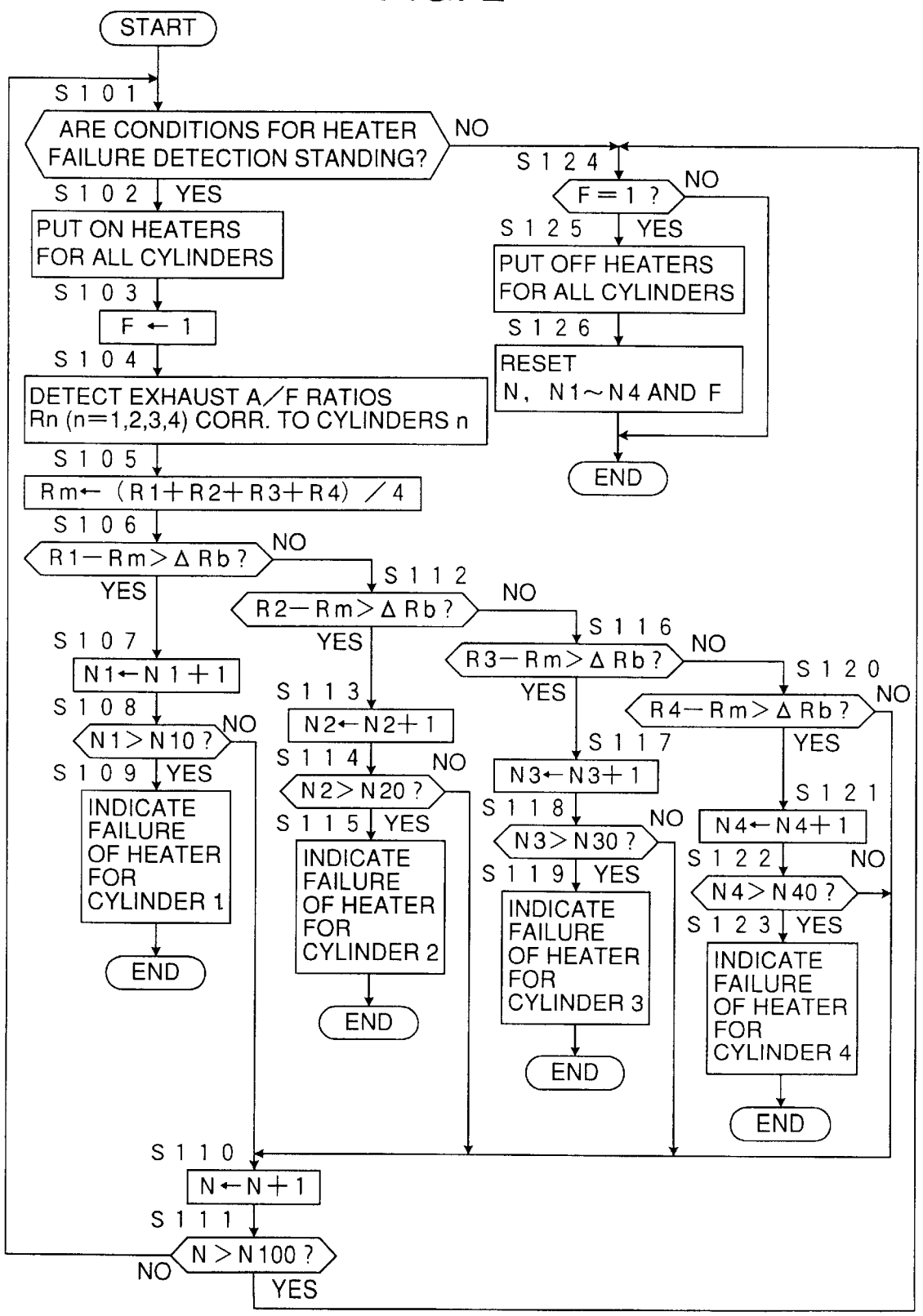
FIG. 2 is a flowchart showing another embodiment of a method for detecting a failure of injection fuel heaters of an internal combustion engine according to the present invention.

FIG. 2 is a flowchart showing another embodiment of the heater failure detecting method according to the present invention.

When the control is started by a closure of an ignition switch not shown in the figure as in FIG. 1, in step 101, as in step 1 of FIG. 1, it is judged if the conditions for executing the heater failure detecting operation are standing or not. When the answer is yes, the control proceeds to step 102, wherein the heaters for all cylinders are put on for the heater failure detection. This operation may be the same as in step 3. Then the control proceeds to step 103, where a flag F is set to 1.

Then the control proceeds to step 104, and in the same manner as in step 5, air/fuel ratios Rn of exhaust gases corresponding to cylinders n (n=1, 2, 3, 4) are detected. Then in step 105, a mean value Rm of R1, R2, R3 and R4 is calculated. When there is no failure of the heater for any of cylinders 1–4, the mean value Rm expresses a mean air/fuel ratio of the engine operating with the heaters for all cylinders being put on, at, for example, a stoichiometric air/fuel ratio.

However, when the heater of any one of the cylinders has failed, since the air/fuel ratio corresponding to the cylinder becomes higher than in the normal operation, Rm increases correspondingly. Nevertheless, as described above, since the probability of two heaters failing at the same time (not the probability that a second heater fails while a failure of a first heater has been left unrepaired), the degree of increase of the mean value Rm is slight (a mean of one higher air/fuel ratio with no heating and three lower air/fuel ratios with heating).

In step 106, it is judged if the difference between the air/fuel ratio R1 of the exhaust gas corresponding to cylinder 1 and the meant value Rm is larger than a predetermined threshold value ΔRb or not. If the answer is yes, it is guessed that the heater for cylinder 1 has failed.

Further, in this embodiment, in order to make such a guess of failure of any particular heater to be more reliable, the control proceeds to step 107, wherein a count number N1 of a counter constructed as a software by a part of the microcomputer of the vehicle operation control means not shown is increased by 1 starting from the initially reset zero. Then the control proceeds to step 108, wherein it is judge if the count number N1 has exceeded a predetermined threshold value N10 such as e.g. 3–5.

When the answer is yes, the control proceeds to step 109, wherein it is indicated that the heater for cylinder 1 has failed. Then the control is terminated. When the answer of step 108 is no, the control proceeds to step 110, wherein count number N of an overall counter provided also as a software in the microcomputer is increased by 1 starting from the initially reset zero. Then the control proceeds to step 111, wherein it is judged if N has exceeded a threshold value N100 which may be set as e.g. 8–10.

When the answer of step 111 is no, the control returns to step 101, and again it is judged if the conditions for executing the heater failure detection are still standing. When the answer is yes, the control passes again through steps 102 and 103 to step 104, wherein the air/fuel ratios Rn of the exhaust gases corresponding to the respective cylinders n are detected. Then in step 105, the means value Rm is calculated, and then in step 106 it is judged if the difference between R1 and Rm is larger than ΔRb or not.

If the answer is still yes, the control proceeds to step 107, wherein the count number N1 is further increased by 1.

When the control through steps 101–106 is repeated to confirm that the answer of step 106 is yes for several times such as to exceed the threshold value N10, it is now indicated that the heater for cylinder 1 has failed.

When the answer of step 106 at the first arrival of the control thereto is no, or the answer of step 106 has turned into no after the control through steps 101–108, 110 and 111 has been passed once or several times less than N10, the control proceeds to step 112, wherein it is judged if the difference between the air/fuel ratio R2 of the exhaust gas corresponding to cylinder 2 and the mean value Rm is larger than ΔRb.

When the answer is yes, the control proceeds to step 113, and count number N2 of another counter provided as a software in the microcomputer is increased by 1, starting from the initially reset zero. Then in step 114 it is judged if N2 has exceeded a threshold value N20 which may also be a number such as 3–5. In this case also, when the answer of step 114 becomes yes, the control proceeds to step 115, wherein it is indicated that the heater for cylinder 2 has failed, and then the control is terminated.

When the answer of step 114 is no, the control proceeds toward steps 110 and 111, so as further to increase the count value N in addition to the count of the answer of step 108 with regard to cylinder 1 having been yes. As long as the overall count number N does not yet exceed the threshold value N100, the control returns to 101, and upon the confirmation of the conditions for executing the heater failure detection still standing, the detecting control according to step 102 and others is repeated.

When the answer of step 106 is no, and the answer of step 112 is also no, the control proceeds to step 116, wherein it is judged if the difference between the air/fuel ratio R3 of the exhaust gas corresponding to cylinder 3 and the mean air/fuel ratio Rm is larger than ΔRb. When the answer is yes, by employing count number N3 of still another software counter and its threshold value N30, in steps 117 and 118 it is detected for several times that the answer of step 116 is yes, before it is indicated in step 119 that the heater for cylinder 3 has failed, in the same manner as described above with reference to cylinders 1 and 2.

When there is no failure in the heaters for cylinders 1, 2 and 3, so that the control reaches step 120, it is judged if R4 for the heater for cylinder 4 is larger than Rm beyond ΔRb. Then by employing count number N4 of still another software counter and its threshold value N40, it is detected for several times in steps 121 and 122 if it is so, before it is indicated in step 123 that the heater for cylinder has failed, in the same manner as described with reference to cylinders 1–3.

When the operating condition of the engine is unstable, even when, for example, the heater for cylinder 1 has failed, the control will not repeat to proceed from step 106–107 in succession, so that the control proceeds from step 106 to step 112 before the count number N1 exceeds N10, then proceeding to step 116 and further to step 120. Even when it occurs, when the detection cycle is repeated while the conditions for executing the heater failure detection are standing, the count number N1 will soon exceed the threshold value N10, so that the failed heater is definitely detected in spite of some noises.

On the other hand, when it is sporadically judged yes in step 106, 112, 116 or 120 due to an unstable operation of the engine in spite of no failure of the heaters, the overall count value N will exceed the threshold value N100 before none of the count values N1, N2, N3 and N4 exceeds its corresponding threshold value N10, N20, N30 or N40. Then the control proceeds to step 124, wherein, since the flag F is 1 at this time, the control proceeds to step 125, and the operation of all heaters started in step 102 for the heater failure detection (non feedback operation) is stopped, and then in step 126 the count values N, N1–N4, and the flag F are reset, and then the control is terminated.

When it is judged in step 101 that the conditions for executing the heater failure detection are not standing from the very beginning or such conditions are lost after the control has once proceeded toward step 102 and further to return to step 101 through step 111, the control proceeds to step 124. In this case also, according to whether the control has once proceeded through step 103 or not, the control proceeds through steps 125 and 126 or bypasses these steps, before the control is terminated.

The manner of judging based upon a plurality of times of detection of the heater failure for each cylinder by the count values N1–N4 and N described above may be incorporated into the flowchart of FIG. 1, so as to be inserted between steps 9 and 10, steps 11 and 12, steps 13 and 14 and steps 15 and 16.

Figure 3:
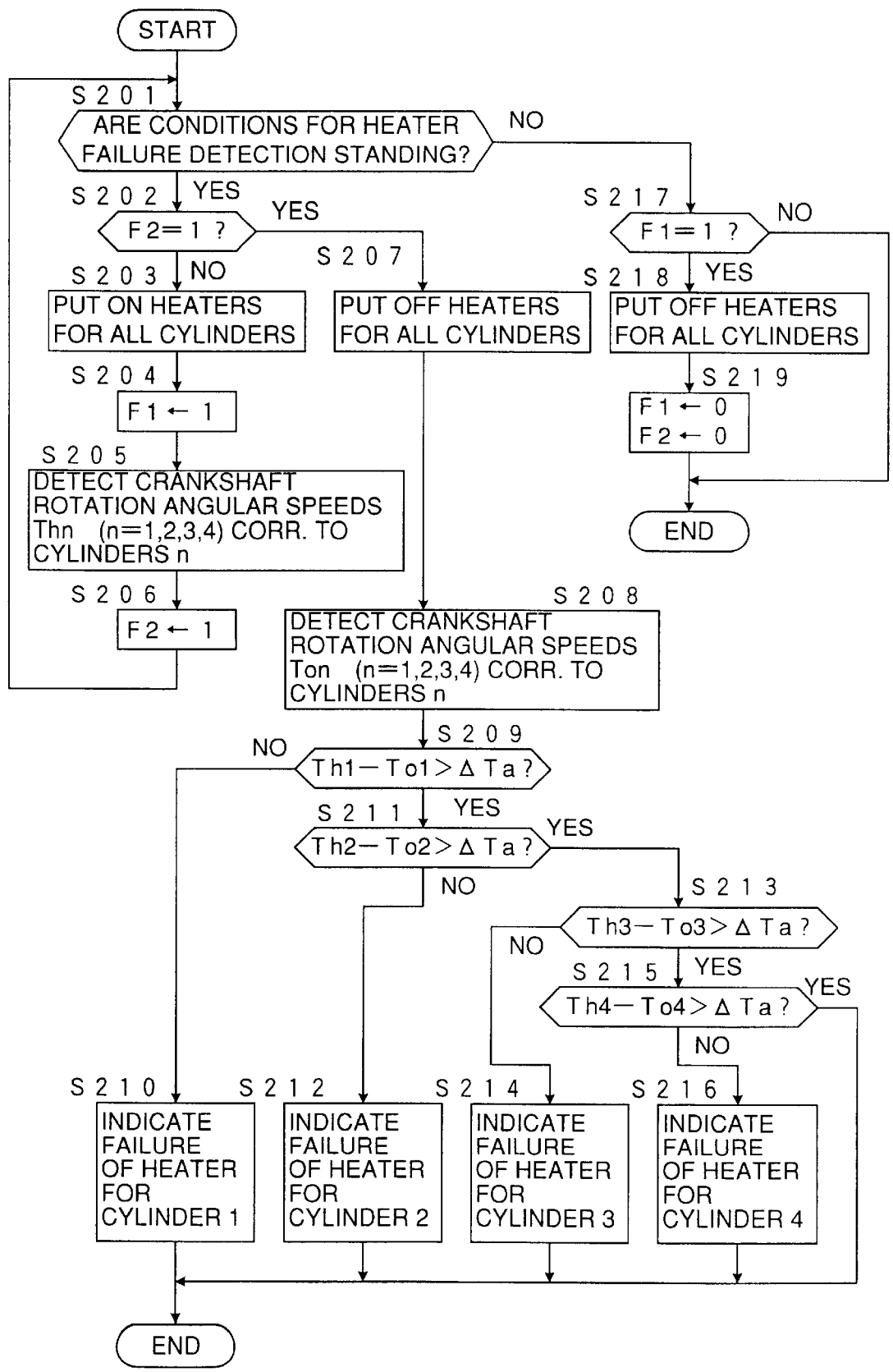
FIG. 3 is a flowchart showing still another embodiment of a method for detecting a failure of injection fuel heaters of an internal combustion engine according to the present invention.

FIG. 3 is a flowchart showing still another embodiment of the heater failure detecting method according to the present invention. The flow of the heater failure detecting operation according to the flowchart of FIG. 3 is similar to that according to the flowchart of FIG. 1, except that in the heater failure detecting operation of FIG. 3, the parameter for detecting a failure of the heater for respective cylinders n is crankshaft rotation angular speeds Thn (also assuming that the engine is a four cylinder engine, n=1, 2, 3, 4) corresponding to the respective cylinders.

Further, in contrast to the flowchart of FIG. 1 in which the mean exhaust air/fuel ratio Ro for the cylinders operating with all heaters being put off is calculated in step 8, in step 208 corresponding thereto, crankshaft rotation angular speeds Ton (n=1, 2, 3 and 4) corresponding to cylinders n of the engine operating with all heaters being put off are detected. In this regard, the crankshaft rotation angular speed may be obtained by differentiating an output of any sensitive crankshaft rotation sensor on time basis by the microcomputer of the vehicle operation control device.

In the rotation of the crankshaft there are intermittent peaks of rotation angular speed corresponding to the combustion strokes of respective cylinders, wherein if the combustion did not regularly occur in any one of the cylinders, the peak of the angular speed corresponding to the cylinder lowers or disappears. The angular speed peak also lowers or disappears when the heater for one of the cylinders has failed during a cold starting of the engine by a part of the injected fuel sticks to the wall surface of the intake port or the combustion chamber so as not to combust.

Therefore, it can be judged if any of the heaters for cylinders 1–4 has failed by judging if the differences between crankshaft rotation angular speeds Th1, Th2, Th3 and Th4 and To1, To2, To3 and To4 are each larger than a predetermined threshold value ΔTa, in the same manner as in the flowchart of FIG. 1.

In other points, the manner of detecting the heater failure according to the flowchart of FIG. 3 is the same as in the flowchart of FIG. 1. In order to show such a correspondence, in the flowchart of FIG. 3 the steps corresponding to those in the flowchart of FIG. 1 are numbered to correspond to those of FIG. 1 with a conversion into the order of 200. It will be appreciated that the detection of a failure of any one of the heaters can be carried out by employing the crankshaft rotation angular speed as a parameter in the same manner as in FIG. 1 employing the air/fuel ratio of the exhaust gas of the respective cylinders.

Further, it will be apparent that also in the heater failure detection control shown by the flowchart of FIG. 3, the manner of judging the heater failure based upon a several times repetition of detections by employing count values N1–N4 and N may be incorporated into between steps 209 and 210, steps 211 and 212, steps 213 and 214 and steps 215 and 216.

Figure 4:
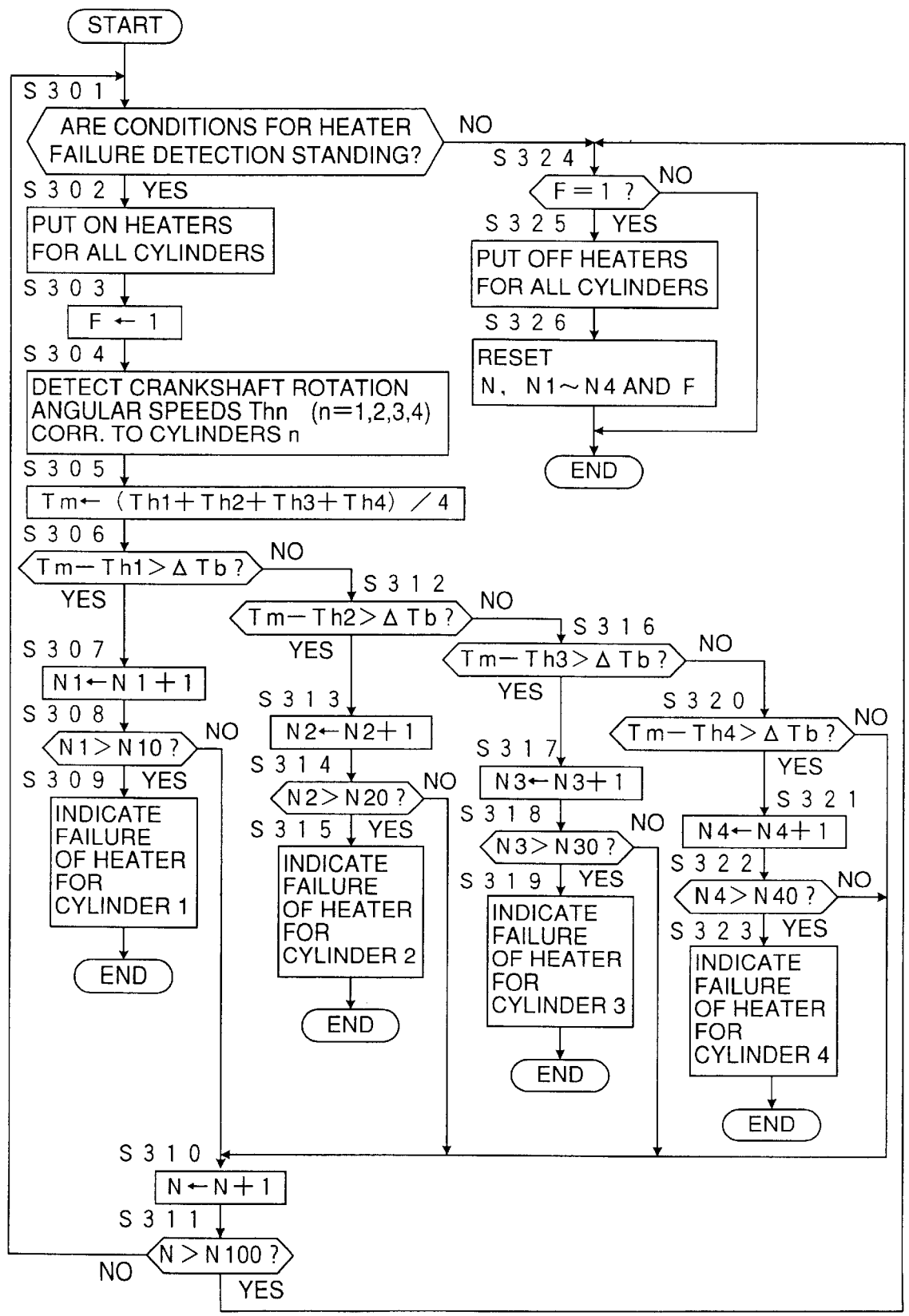
FIG. 4 is a flowchart showing still another embodiment of a method for detecting a failure of injection fuel heaters of an internal combustion engine according to the present invention.

FIG. 4 is a flowchart showing still another embodiment in which the crankshaft rotation angular speed is employed as the parameter for the heater failure detection control, while the process for the heater failure detection control is proceeded in the same manner as in the embodiment shown in FIG. 2. In this embodiment, the crankshaft rotation angular speeds Thn (n=1, 2, 3, 4) detected in step 304 for the respective cylinders n are compared against a mean value Tm of Th1, Th2, Th3 and Th4 in steps 306, 312, 316 and 320, respectively, and when the difference is larger than a predetermined threshold value ΔTb more than a predetermined times, it is judged that the heater for the corresponding cylinder has failed.

Since in other points the progress of the heater failure detection control of this embodiment is the same as that of the embodiment shown in FIG. 2, the steps corresponding to those in FIG. 2 are numbered to correspond to those in FIG. 2 with a conversion of the 100 order to the 300 order, and further descriptions will be omitted in order to avoid a redundancy of the specification.

Figure 5:
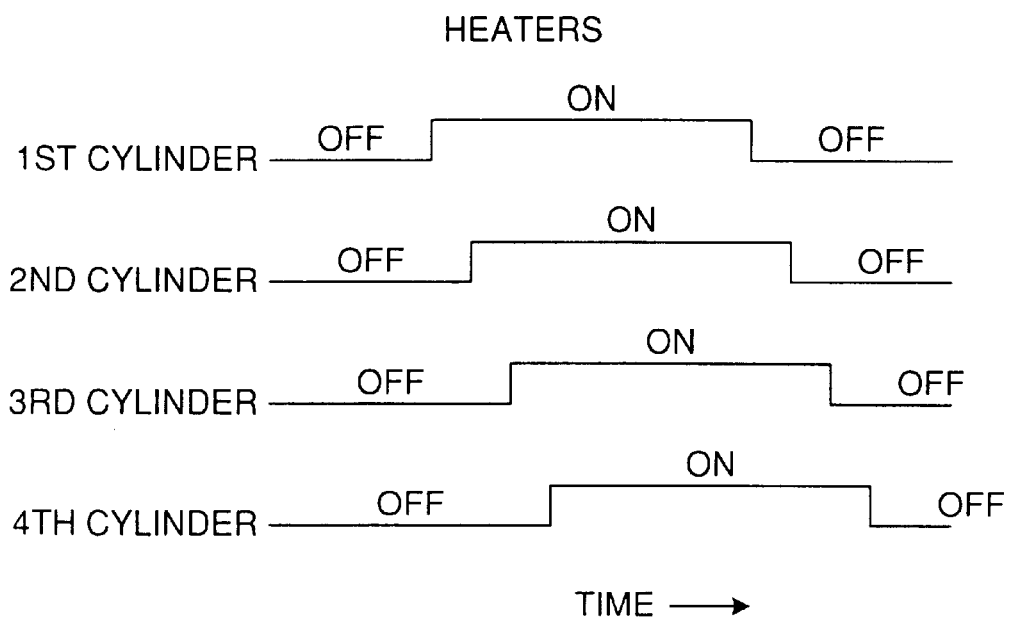
FIG. 5 is a diagram showing an example of a manner of shifting in time the operation of the heaters for the respective cylinders of a multi-cylinder internal combustion engine, in order to more clearly detect a change which occurs in an operating parameter such as exhaust air/fuel ratio or crankshaft rotation angular speed according to the engine being operated with the heaters put on or put off.

FIG. 5 is a diagram showing an example of a manner for shifting in time the operation of the heaters for respective cylinders of a multi-cylinder internal combustion engine in order to detect the difference exhibited in an operation parameter of the engine such as the exhaust air/furl ratio or the crankshaft rotation angular speed by the engine being operated with the heaters put on in contrast to the engine being operated with the heaters put off.

In this example, the time points for starting the respective heaters are successively shifted in order to more clearly see the influence of the on and off of the heaters on the operation parameter in regard to the respective cylinders. This example also shows how to shift the time points for stopping the operation of the heaters for the respective cylinders.

By the time points for starting or stopping the operation of the heaters for the respective cylinders being shifted relative to one another, the heaters for the respective cylinders are more clearly detected independently of the other with regard to if there is any failure in each of the heaters.

Figure 6:
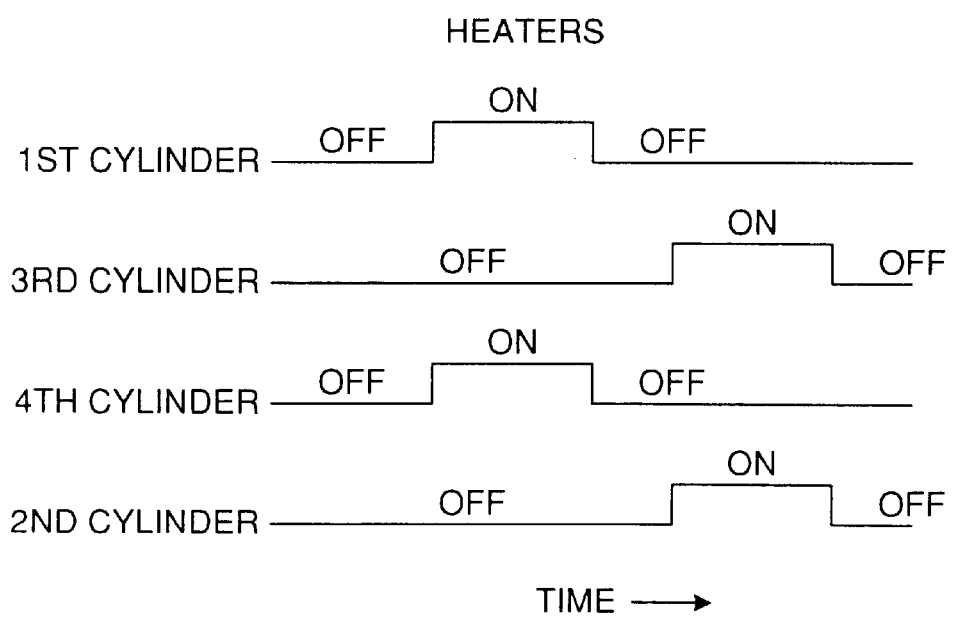
FIG. 6 is a diagram similar to FIG. 5, showing another example.

FIG. 6 is a diagram similar to FIG. 5, showing another embodiment of the manner of shifting in time the operation of the heaters for the respective cylinders of a multi-cylinder internal combustion engine for the same purpose as in FIG. 5. In this example, two cylinders most remote from one another in the phases of operation of the engine (1st and 4th cylinders or 3rd and 2nd cylinders in a four cylinder engine) are made a pair and the heaters for each pair of cylinders are operated at the same time as shifted in the time of operation relative to the other pair of cylinders.

In this case, although each pair of heaters are simultaneously operated, the time point of detecting the data of an operation parameter such as the exhaust air/fuel ratio or the crankshaft rotation angular speed with respect to the fuel combustion is much different with respect to the two heaters of the pair, so that if a failure has occurred in one of the two heaters of each pair, it can be determined at a higher precision which of the two heaters has failed.

Figure 7:
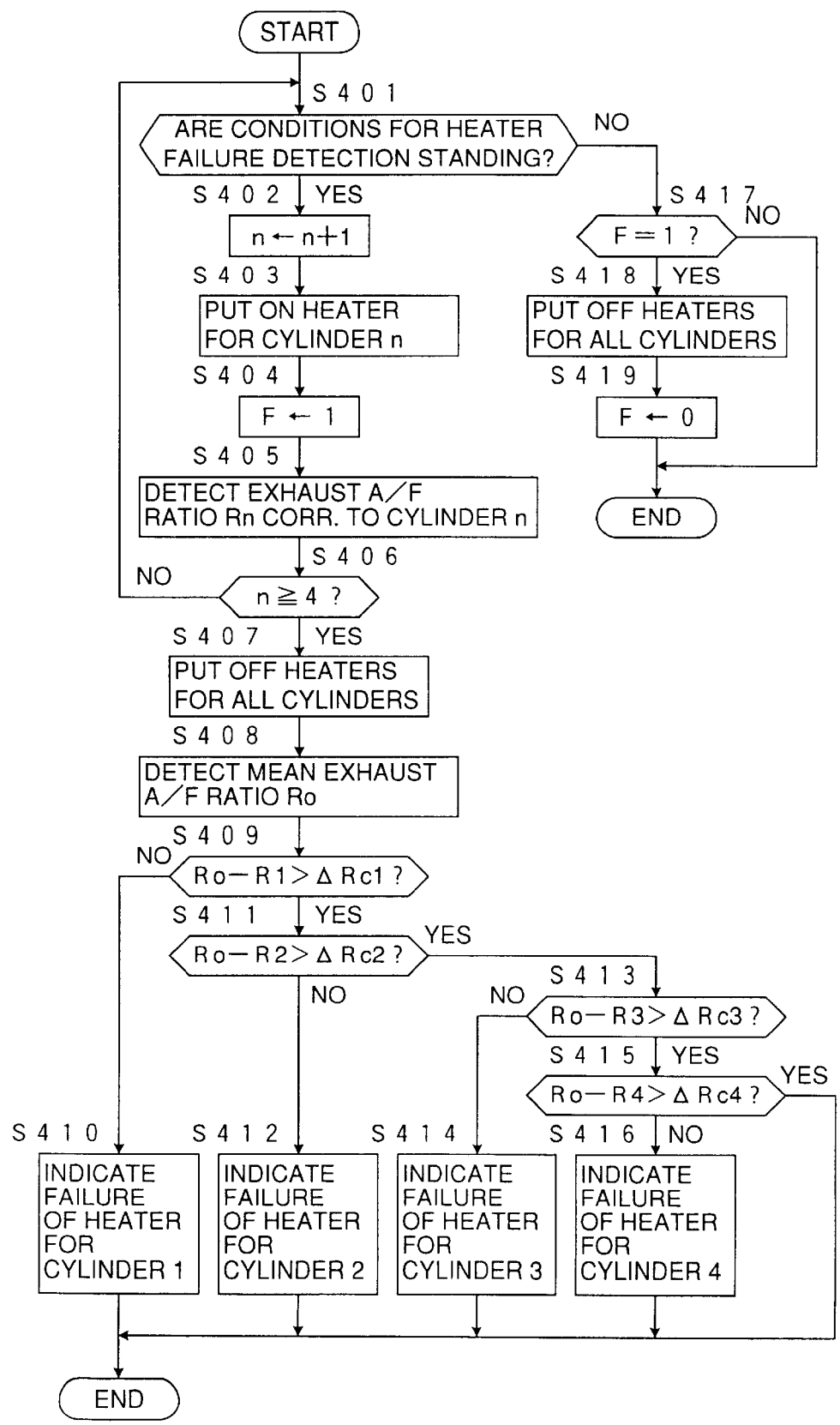
FIG. 7 is a flowchart showing an embodiment in which the concept of successively shifting the putting on of the heaters shown in FIG. 5 for the respective cylinders is incorporated into the embodiment of FIG. 1.

FIG. 7 is a flowchart showing an embodiment in which the concept of successively shifting in time the operation of the heaters for the respective cylinders shown in FIG. 5 was incorporated into the embodiment of FIG. 1. In this embodiment, the timing is shifted with respect to putting on the heaters from the put off condition. When the control is started, in step 401, it is judged if the conditions for executing the heater failure detection are standing.

When the answer is yes, the control proceeds to step 402, wherein n specifying the cylinders is increased by 1 starting from the initially reset 0. Herein n indicates the order of the cylinders to be put on successively with a time shift such as shown in FIG. 5, not to specify the constructional order of the cylinders in the engine. Then in step 403, the heater for cylinder n, i.e., 1st cylinder is put on. Then in step 404, a flag F is set to 1 to show that the operation of the heaters has started.

Then in step 405, the exhaust air/fuel ratio R1 corresponding to cylinder 1 is detected. Then in step 406, assuming that the engine is a four cylinder engine, it is judged if n has reached 4. When the answer is no, the control returns to step 401, and in this embodiment, after having confirmed that the conditions for executing the heater failure detection are still standing, the control proceeds again to step 402, wherein n is increased by 1. Then in step 403, the heater for cylinder 2 is put on.

Thus, the air/fuel ratios R1–R4 for the four cylinders are detected. In this case, the air/fuel ratios R1–R4 are each more specifically detected than in the embodiment of FIG. 1 in which all heaters are simultaneously put on, so that a failure or not of each heater is more clearly detected. When the air/fuel ratios R1–R4 for the four cylinders have been obtained so that the answer of step 406 turns into yes, the control proceeds to step 407, wherein all heaters are put off.

Then in step 408, a mean value Ro of the exhaust air/fuel ratio for the condition that the heaters are not operated is detected. Hereafter, the heater failure detection control is carried out in the same manner as in the embodiment of FIG. 1, by setting appropriate threshold values ΔRc1–ΔRc4 for the differences between Ro and R1–R4, respectively.

Herein it will be noted that, although R1–R4 are the air/fuel ratios corresponding to cylinders 1–4 with each corresponding heater being individually put on, what is detected in step 405 for n=1 is the air/fuel ratio corresponding to cylinder 1 with only one heater for cylinder 1 being put on, while what is detected in step 405 for n=2 is the air/fuel ratio corresponding to cylinder 2 with two heaters for cylinders 1 and 2 being put on, and so on. Therefore, the values of R1–R4 will not completely be free of an influence of other heater or heaters being on or off. In view this, individual threshold values such as ΔRc1–ΔRc4 are set out for the differences between Ro and R1–R4, respectively.

In FIG. 7, steps corresponding to steps 9–19 in the embodiment of FIG. 1 are numbered as 409–419, respectively, with a conversion of numbers to the order of 400. Since the control of these steps by the flowchart of FIG. 7 should be obvious in view of FIG. 1, further descriptions will be omitted in order to avoid a redundancy of the specification.

Figure 8:
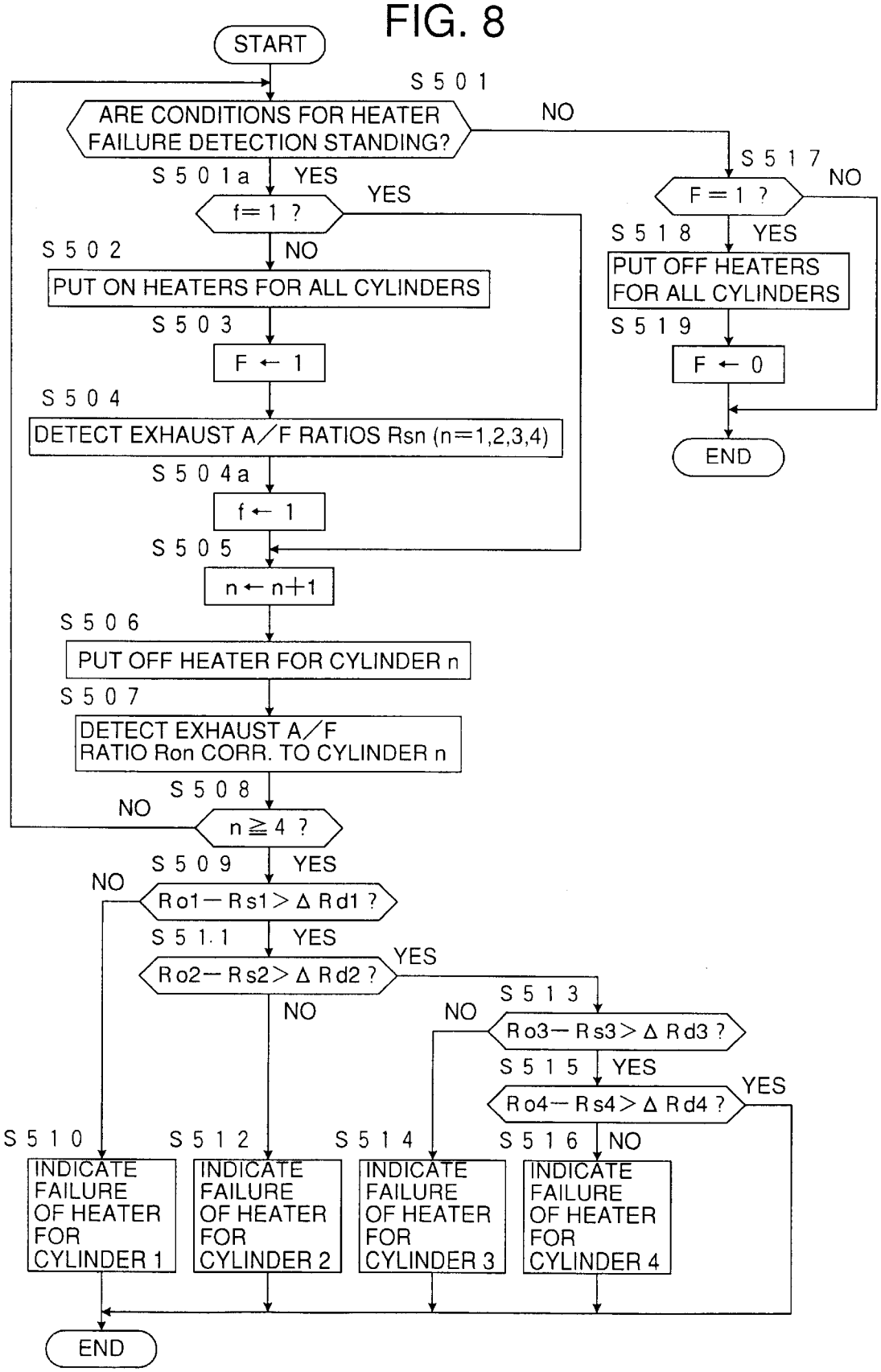
FIG. 8 is a flowchart showing an embodiment in which the concept of successively shifting the putting off of the heaters shown in FIG. 5 for the respective cylinders is incorporated into the embodiment of FIG. 1.

FIG. 8 is a flowchart modified from the embodiment of FIG. 1 by incorporating the concept of successively shifting in time the operation of the heaters for the respective cylinders as shown in FIG. 5, like the embodiment of FIG. 7, though in this case the times of putting off the heaters are successively shifted for the respective cylinders.

When the control is started, in step 501, it is judged if the conditions for executing the heater failure detection are standing, and when the answer is yes, the control proceeds to step 501a, wherein it is judged if a flag f is 1. In the first cycle, it is 0 as initially reset, and then the control proceeds to step 502, wherein the heaters for all cylinders are put on. Then in step 503, a flag F is set to 1 to show that the heaters are put on.

Then in step 504 exhaust air/fuel ratios Rsn (n–1, 2, 3 and 4) corresponding to cylinders n are detected with the heaters for all cylinders put on. Then in step 504a, the flag f is set to 1, so that in the subsequent cycles steps 502 through 504a are bypassed. Then in step 505, n is incremented by 1. Then in step 506, starting from cylinder 1, the heaters for the respective cylinders n are successively put off. Each time when the heater for each cylinder is put off, in step 507 the exhaust air/fuel ratio Ron (n=1, 2, 3 and 4) corresponding to cylinder n is detected until the detections with respect to the four cylinders are finished, so that the answer of step 508 turns to yes.

Thereafter, in the same manner as in the embodiment of FIG. 1, based upon the differences between Rs1–Rs4 and Ro1–Ro4, respectively, and appropriately determined threshold values ΔRd1–ΔRd4, it is judged if any heater has failed. In FIG. 8, steps corresponding to steps 9–19 in the embodiment of FIG. 1 are numbered as 509–519, respectively, with a conversion of numbers to the order of 500. Since the control of these steps by the flowchart of FIG. 8 should be obvious in view of the embodiment of FIG. 1, further descriptions will be omitted to avoid a redundancy of the description.

Figure 9:
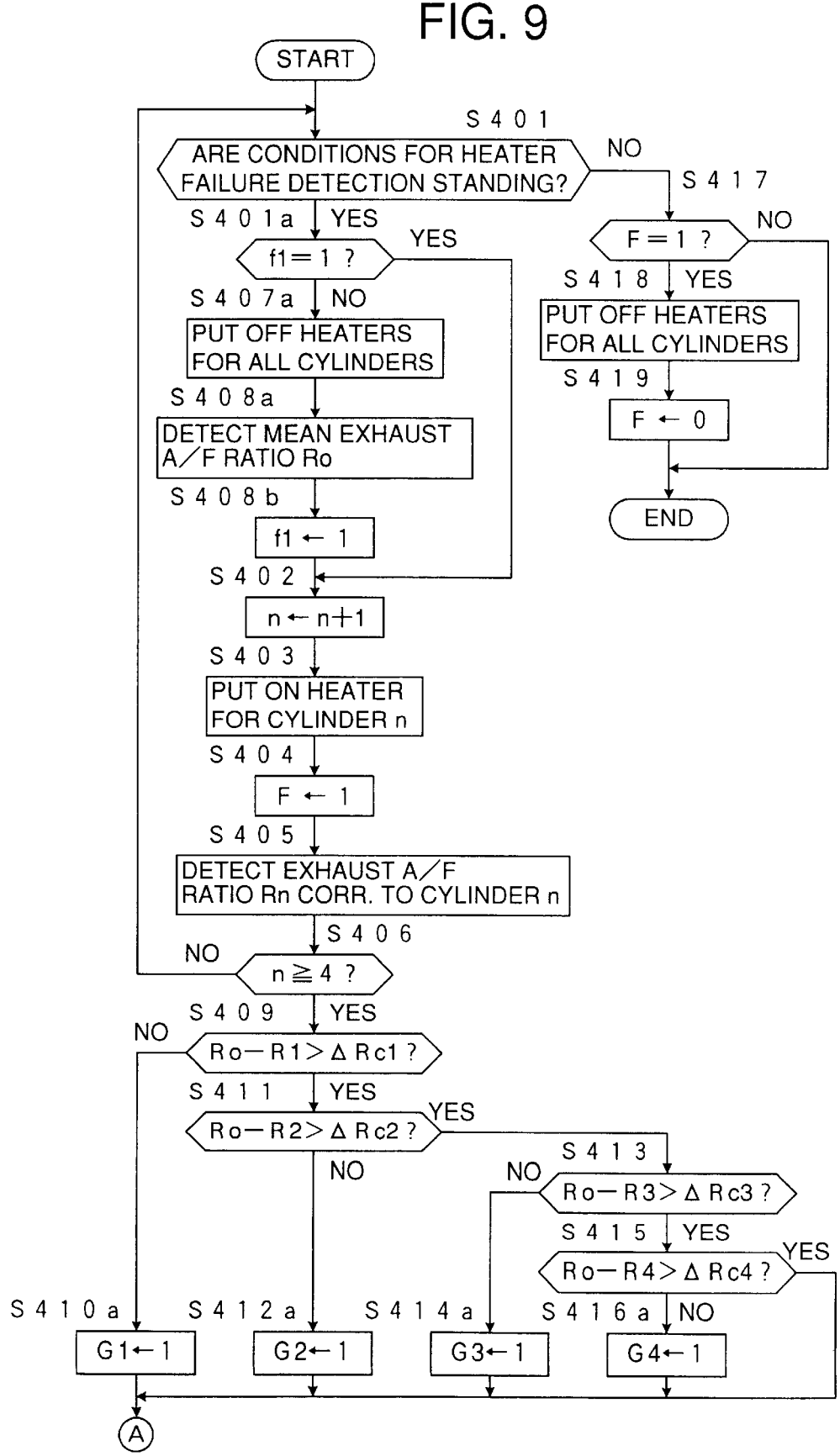
FIG. 9 is a flowchart showing a part of an embodiment in which the controls according to FIGS. 7 and 8 are combined, this part corresponding to FIG. 7.
Figure 10:
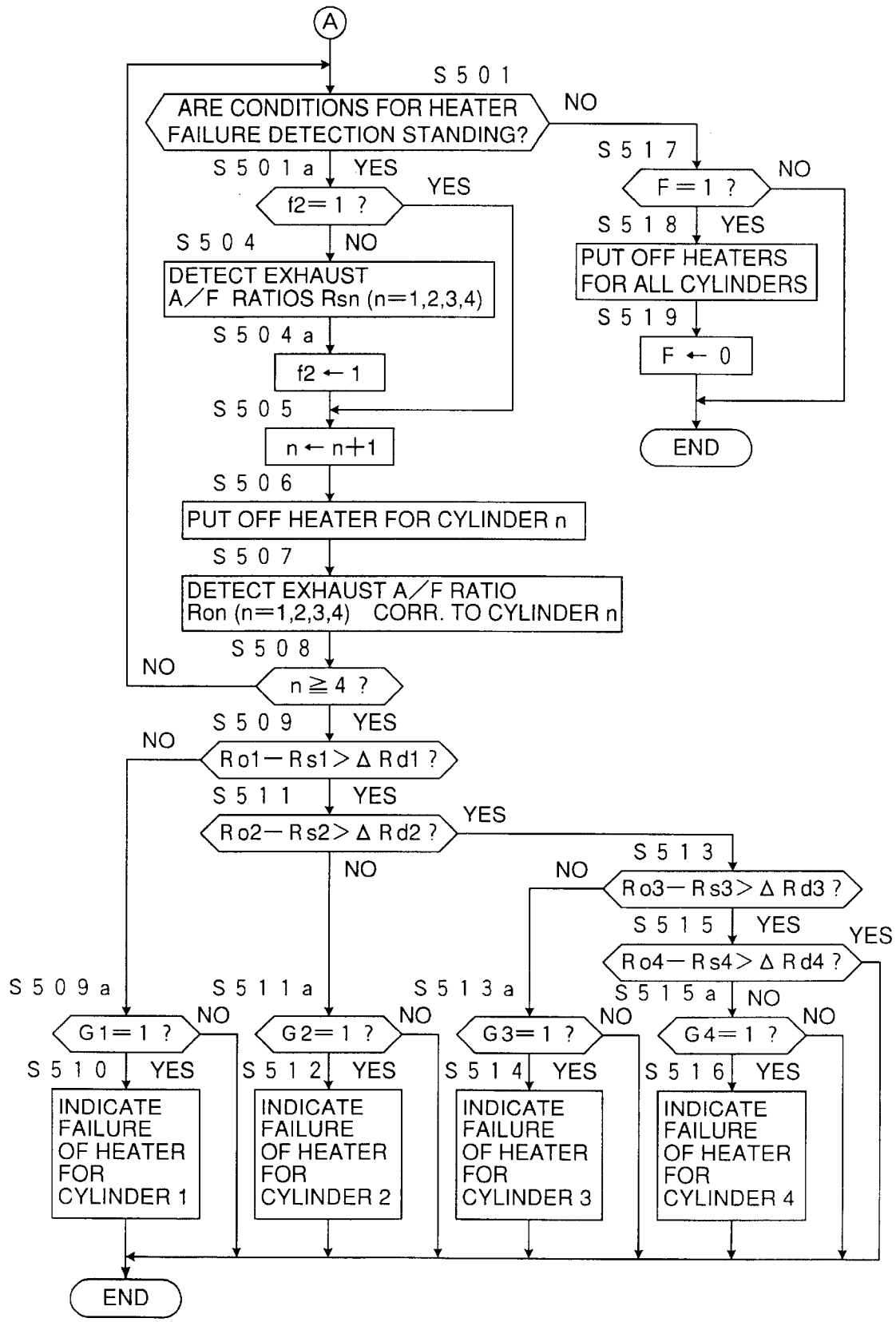
FIG. 10 is a flowchart showing a part of the embodiment in which the controls according to FIGS. 7 and 8 are combined, this part corresponding to FIG. 8.

FIGS. 9 and 10, as connected at terminal A, show an embodiment in which the heater failure detection processes shown in FIGS. 7 and 8 are executed in combination, so that when one of the heaters has failed, the failure is more definitely detected. Further, in this combination, it is so arranged that the heaters are successively put on, and after all heaters have been put on, in succession thereto, the heaters are successively put off, thereby sparing the step of putting off all heaters in FIG. 7 (step 407) and the step of putting on all heaters in FIG. 8 (step 502), respectively.

According to this embodiment, in the heater failure detecting process of FIG. 9 corresponding to that of FIG. 7, steps 407 and 408 of FIG. 7 are however moved to between steps 401 and 402 as step 407a and 408a, with a one time pass system by steps 401a and 408b with a flag f1, so that the mean exhaust air/fuel ratio Ro with all heaters being off is detected before successively putting on the heaters. In this regard, in the embodiment of FIG. 7, step 403 for putting on the heaters is placed as at an earlier stage as possible, so that even during the heater failure detecting operation, the effect of the heaters is obtained as much as possible. Then steps 402 through 406 are executed to detect exhaust air/fuel ratios Rn (n=1, 2, 3, 4) corresponding to cylinders n with the heaters put on. When the control comes to step 410a, 412a, 414a or 416a corresponding to steps 410, 412, 414 or 416, respectively, flag G1, G2, G3 or G4 is set to 1, respectively.

In the heater failure detecting process of FIG. 10 corresponding to the heater failure detecting process of FIG. 8, step 502 is no longer required as the heaters are all already put on. In step 504, the air/fuel ratios Rsn (n=1, 2, 3, 4) with the heaters put on are once detected for cylinders 1–4, respectively, with a one time pass system constructed by steps 501a and 504a and a flag f2. When the answer of step 509, 511, 513 or 515 turns into yes, the control proceeds to steps 509a, 511a, 513a or 515a, respectively, wherein it is judged if the flags G1, G2, G3 or G4 is 1. Based upon such a double checking, in step 510, 512, 514 or 516, it is indicated that the heater of a corresponding cylinder has failed.

Figure 11:
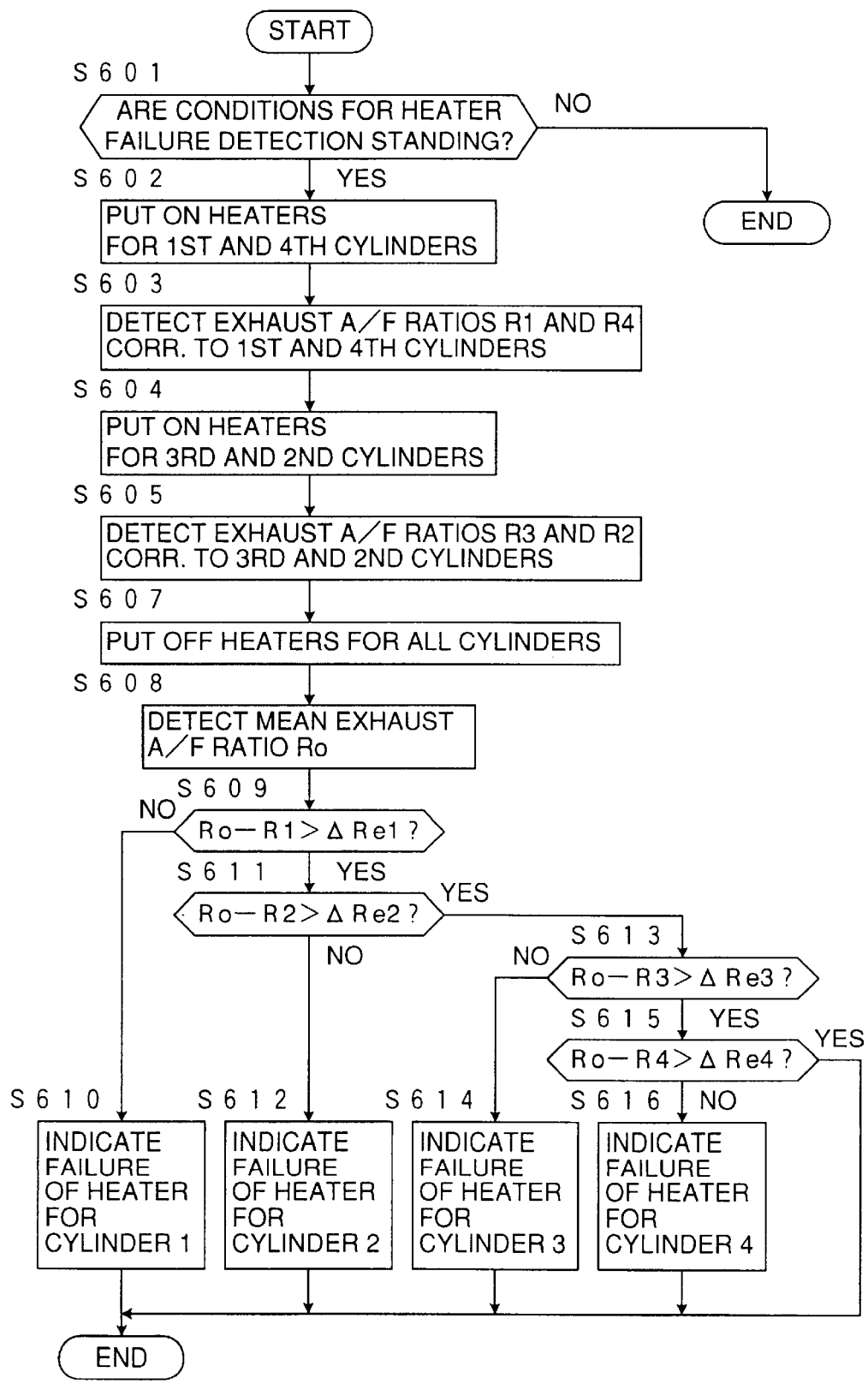
FIG. 11 is a flowchart showing an embodiment in which the concept of pairing two heaters and shifting pairs of heaters relative to one another in putting on the heaters shown in FIG. 6 is incorporated into the embodiment of FIG. 1.

FIG. 11 is a flowchart showing an embodiment in which the concept of pairing two cylinders most distant from one another in the operational phases of the engine and operating the pairs of heaters with a time shift therebetween shown in FIG. 6 being incorporated into the embodiment of FIG. 1. In this embodiment, the time point of putting on of the pairs of heaters are shifted between the pairs. When the control is started, in step 601 it is judged if the conditions for executing the heater failure detection are standing, and when the answer is yes, the control proceeds to step 602, wherein, assuming that the engine is a four cylinder engine, the heaters for the first and fourth cylinders are put on. Then in step 603, the exhaust air/fuel ratios R1 and R4 for the first and fourth cylinders are detected. Then the control proceeds to step 604, wherein the heaters for the third and second cylinders are put on. Then in step 605, the exhaust air/furl ratios R3 and R2 corresponding to the third and second cylinders are detected. Then in step 607, all heaters are put off, and in step 608, a means exhaust air/fuel ratio Ro for the engine operating with all heaters being put off is detected.

Based upon the exhaust air/fuel ratios R1–R4 corresponding to the first-fourth cylinders with the heaters being put on and the mean exhaust air/fuel ratio Ro with the heaters not being put on, it is detected if any of the heaters has failed according to step 609–616 corresponding respectively to steps 9–16 in FIG. 1. On the other hand, when the answer of step 601 is no, the control is immediately terminated. The control operations of this embodiment will be clear in view of the descriptions made for the embodiment of FIG. 1. Therefore, further descriptions will be omitted in order to avoid a redundancy of the description.

Figure 12:
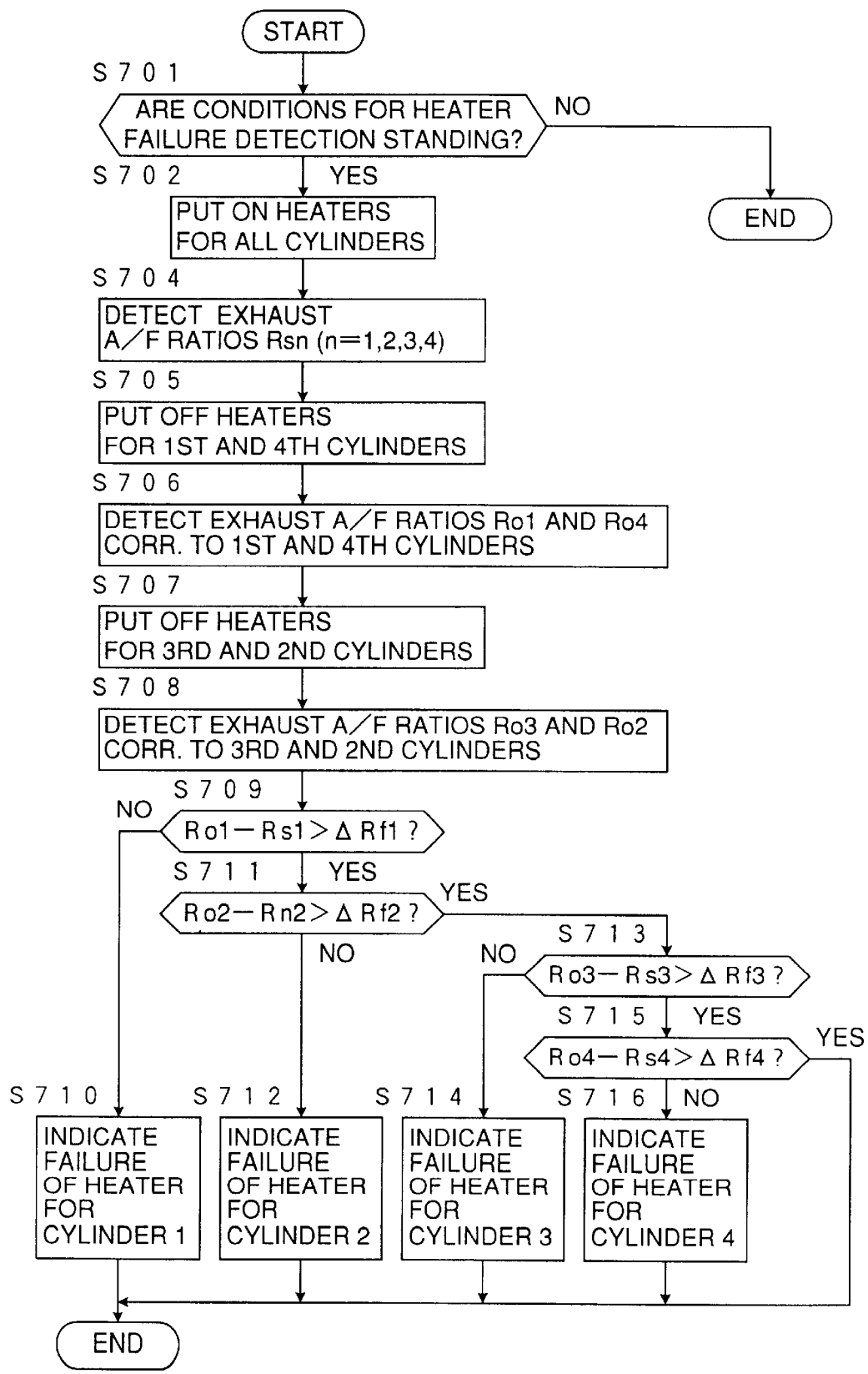
FIG. 12 is a flowchart showing an embodiment in which the concept of pairing two heaters and shifting pairs of heaters relative to one another in putting off the heaters shown in FIG. 6 is incorporated into the embodiment of FIG. 1.

FIG. 12 shows an embodiment in which the concept of pairing two cylinders most distant from one another in the operational phases thereof and operating the pairs of heaters with a time shift therebetween shown in FIG. 6 is incorporated into the embodiment of FIG. 1 as in the embodiment of FIG. 11, though in this embodiment the shifting of operation between the pairs of cylinders is made with respect to putting off the heaters from the put on condition. When the control is started, in step 701 it is judged if the conditions for executing the heater failure detection are standing. When the answer is yes, the control proceeds to step 702, wherein all heaters are put on. Then step 704, assuming that the engine is a four cylinder engine, air/fuel ratios Rsn (n=1, 2, 3 and 4) corresponding to cylinders n (n=1, 2, 3, 4) for the engine operating with the heaters on are detected. Then the control proceeds to step 705, wherein the heaters for the first and fourth cylinders are put off. Then in step 706, the exhaust air/fuel ratios Ro1 and Ro4 corresponding to the first and fourth cylinders operating with the heaters put off are detected. Then the control proceeds to step 707, and the heaters for the third and second cylinders are put off. Then in step 708 the exhaust air/fuel ratios Ro3 and Ro2 corresponding to the third and second cylinders operating with the heaters put off are detected.

Based upon the exhaust air/fuel ratios Rs1–Rs4 corresponding to the first-fourth cylinders operating with the heaters being put on and the exhaust air/fuel ratios Ro1–Ro4 corresponding to the first-fourth cylinders operating with the heaters being put off thus obtained, it is detected if any of the heaters has failed according to steps 709–716 corresponding respectively to steps 9–16 in FIG. 1. The control operation according to steps 709–716 will be obvious from the descriptions made with reference to the embodiment of FIG. 1. Therefore, further descriptions on this embodiment are omitted in order to avoid a redundancy of the description.

Figure 13:
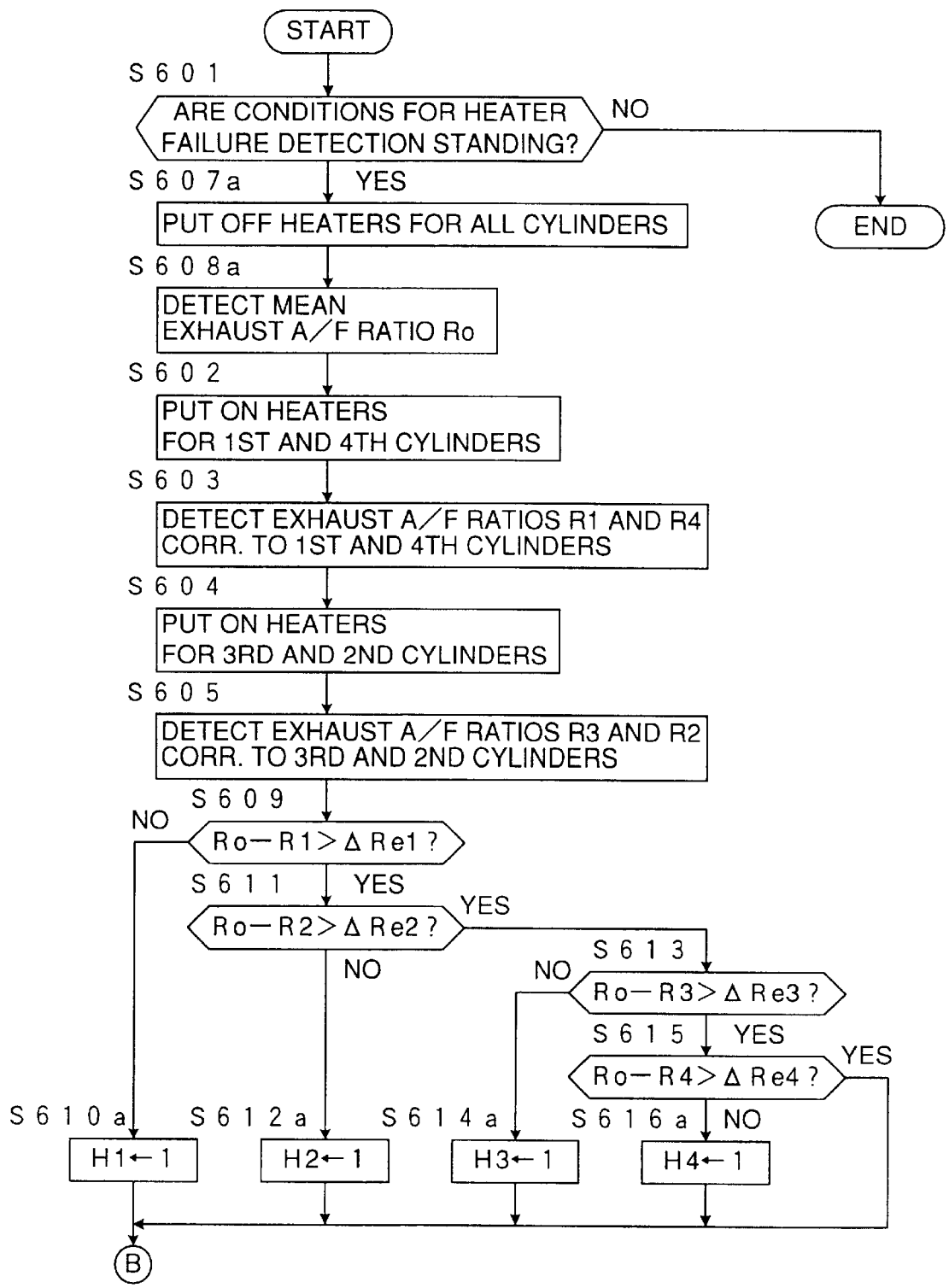
FIG. 13 is a flowchart showing an embodiment combining the controls of FIGS. 11 and 12, showing a part corresponding to FIG. 11.
Figure 14:
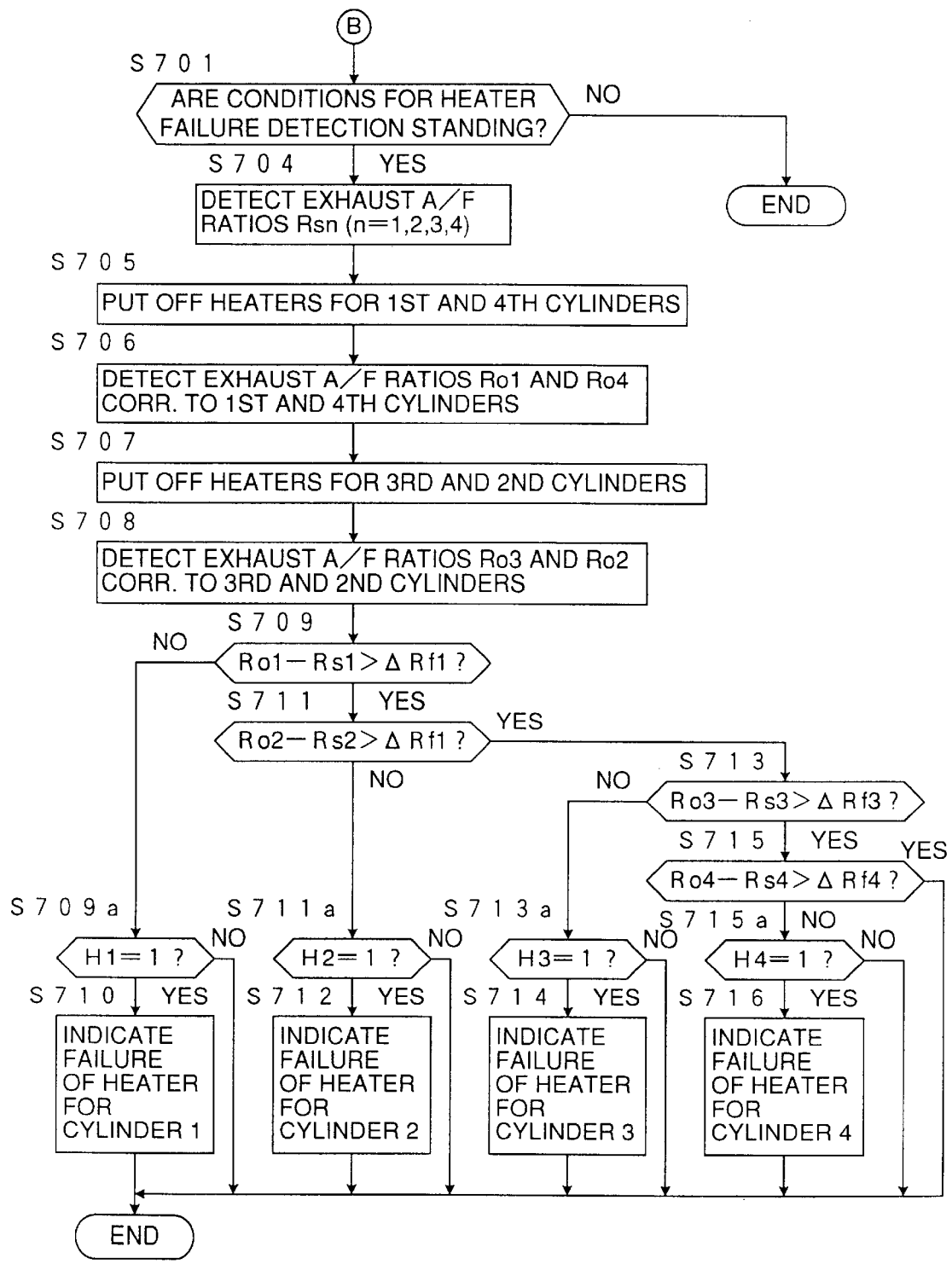
FIG. 14 is a flowchart showing the embodiment combining the controls of FIGS. 11 and 12, showing a part corresponding to FIG. 12.

FIGS. 13 and 14 as combined at terminal B show an embodiment in which a failure of any heater is more definitely detected by the heater failure detecting processes of FIGS. 11 and 12 being executed in combination. Further, in this combination, it is so arranged that the heaters are put on by pairs, and after all the heaters have been put on, in succession thereto, the heaters are put off by pairs.

In this case, in the heater failure detecting process of FIG. 13 corresponding to that of FIG. 11, steps 607 and 608 of FIG. 11 are moved to between steps 601 and 602 as steps 607a and 608a, so that the mean exhaust air/fuel ratio Ro with all heaters put off is first detected before the heaters are put on by pairs. Thereafter, steps 602 through 605 and steps 609, 611, 613 and 615 are executed in the same manner as in FIG. 11. When the answer of step 609, 611, 613 or 615 is no, the control proceeds to step 610a, 612a, 614a or 616a, and flag H1, H2, H3 or H4 is set to 1. In the heater failure detecting process of FIG. 14 corresponding to that of FIG. 12, starting from the condition that all heaters are on, 704–708 are executed in the same manner as in FIG. 12, until the control reaches step 709, 711, 713 or 715. When the answer of step 709, 711, 713 or 715 is yes, the control proceeds to step 709a, 711a, 713a or 715a, and it is judged if the flag H1, H2, H3 or H4 is 1. Then by a double checking according to the processes of FIGS. 12 and 13, a failure of any heater is detected.

In FIGS. 7–14, it was shown that the concept of successively shifting the heaters for the respective cylinders or pairing two heaters for two cylinders and shifting such pairs relative to one another shown in FIG. 5 or 6 are incorporated into the embodiment of FIG. 1. It will be apparent that such a modification is also possible with respect to the embodiments shown in FIGS. 2–4.

Although the invention has been described with reference to several embodiments thereof in the above, it will be apparent for those skilled in the art that various modifications are possible within the scope of the present invention.

What is claimed is:

1. A method for detecting a failure of heaters provided in a fuel supply system of an internal combustion engine for heating an injection fuel, comprising the step of detecting the failure based upon a change which occurs at least in a parameter concerned with operating conditions of the engine due to the injected fuel not having been heated to a predetermined degree of heating.

2. A method according to claim 1, wherein the change in the parameter is an increase of exhaust air/fuel ratio of an exhaust gas of the engine as compared with a value thereof to be expected when the injected fuel has been heated to the predetermined degree of heating.

3. A method according to claim 1, wherein the change in the parameter is a change in a performance of at least one of rotational speed, rotational acceleration and changes thereof of the engine corresponding to one of cylinders thereof.

4. A method according to claim 1, wherein the change in the parameter is a substantial non difference between values of the parameter according to operations of the engine with the heater being put on and the heater not being put on, respectively.

5. A method according to claim 1, wherein the change in the parameter is a substantial difference in values thereof between cylinders of the engine.

6. A method according to claim 4, wherein the heaters for respective cylinders of the engine are operated with a time shift therebetween in order to detect the difference in the parameter between an operation of the engine with the heaters being put on and an operation of the engine with the heaters not being put on.

7. A method according to claim 6, wherein the heaters for respective cylinders are put on with a time shift therebetween for the time shifted operations of the heaters for the respective cylinders.

8. A method according to claim 6, wherein the heaters for respective cylinders are put off with a time shift therebetween for the time shifted operations of the heaters for the respective cylinders.

9. A method according to claim 4, wherein two cylinders which are most distant from one another in phases of operation of the engine are made a pair of cylinders, and the heaters for such pairs of cylinders are operated with a time shift therebetween in order to detect a difference in the parameter between an operation of the engine with the heaters being operated and an operation of the engine with the heaters not being operated.

10. A method according to claim 9, wherein the time shifted operations for the respective cylinders are to put on the heaters with a time shift between respective such pairs of cylinders.

11. A method according to claim 9, wherein the time shifted operations of the heaters are to put off the heaters with a time shift between respective such pairs cylinders.

* * * * *